(12) United States Patent
Ahn et al.

(10) Patent No.: US 12,456,779 B2
(45) Date of Patent: Oct. 28, 2025

(54) BATTERY MODULE, BATTERY PACK, AND VEHICLE

(71) Applicant: LG ENERGY SOLUTION, LTD., Seoul (KR)

(72) Inventors: Soo-Jun Ahn, Daejeon (KR); Bum Choi, Daejeon (KR); Dae-Hee Son, Daejeon (KR); Dong-Hwan Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 549 days.

(21) Appl. No.: 17/915,475

(22) PCT Filed: Sep. 2, 2021

(86) PCT No.: PCT/KR2021/011877
§ 371 (c)(1),
(2) Date: Sep. 28, 2022

(87) PCT Pub. No.: WO2022/050731
PCT Pub. Date: Mar. 10, 2022

(65) Prior Publication Data
US 2023/0124945 A1    Apr. 20, 2023

(30) Foreign Application Priority Data
Sep. 4, 2020    (KR) .......................... 10-2020-0113332

(51) Int. Cl.
*H01M 50/383* (2021.01)
*H01M 50/213* (2021.01)
*H01M 50/291* (2021.01)

(52) U.S. Cl.
CPC ....... *H01M 50/383* (2021.01); *H01M 50/213* (2021.01); *H01M 50/291* (2021.01)

(58) Field of Classification Search
CPC ............. H01M 50/383; H01M 50/291; H01M 50/213; H01M 50/20
See application file for complete search history.

(56) References Cited

U.S. PATENT DOCUMENTS

| 5,368,953 A | 11/1994 | Zaborney et al. |
| 2003/0180582 A1 | 9/2003 | Masumoto et al. |

(Continued)

FOREIGN PATENT DOCUMENTS

| CN | 102055003 A | 5/2011 |
| CN | 103999255 A | 8/2014 |

(Continued)

OTHER PUBLICATIONS

Office Action issued in corresponding Chinese Patent Application No. 202180015166.9, dated Aug. 12, 2023. Note: CN109326753 A, CN 210379143 U, KR 10-2123684 B1, WO 2019/211555 A1 have been previously cited).

(Continued)

*Primary Examiner* — Kenneth J Douyette
(74) *Attorney, Agent, or Firm* — Morgan, Lewis & Bockius LLP

(57) ABSTRACT

A battery module includes a plurality of battery cells respectively having electrode terminals and configured to be erected long in a vertical direction, an upper cover having a plurality of exposing holes to expose the upper portion of each of the plurality of battery cells to the outside at least partially, a lower cover having a plurality of exposing holes to expose the lower portion of each of the plurality of battery cells to the outside at least partially, and a filling member, of an electrically insulating material, in the plurality of exposing holes to seal the plurality of exposing holes formed in at least one of the upper cover and the lower cover.

14 Claims, 10 Drawing Sheets

(56) References Cited

U.S. PATENT DOCUMENTS

| | | |
|---|---|---|
| 2014/0329138 A1 | 11/2014 | Park et al. |
| 2016/0056427 A1* | 2/2016 | Kim .................... H01M 50/512 |
| | | 429/151 |
| 2016/0118633 A1 | 4/2016 | Hongo et al. |
| 2016/0149169 A1 | 5/2016 | Okura |
| 2016/0285142 A1 | 9/2016 | Kimura |
| 2017/0214103 A1 | 7/2017 | Onnerud et al. |
| 2018/0053977 A1 | 2/2018 | Lebreux et al. |
| 2018/0212222 A1 | 7/2018 | Barton et al. |
| 2019/0020001 A1 | 1/2019 | Nakano et al. |
| 2019/0273243 A1 | 9/2019 | Motokawa et al. |
| 2020/0076022 A1 | 3/2020 | Kawakami et al. |
| 2021/0057789 A1 | 2/2021 | Lee et al. |

FOREIGN PATENT DOCUMENTS

| | | |
|---|---|---|
| CN | 105514312 A | 4/2016 |
| CN | 105552264 A | 5/2016 |
| CN | 107078364 A | 8/2017 |
| CN | 108604653 A | 9/2018 |
| CN | 109103403 A | 12/2018 |
| CN | 109326753 A | 2/2019 |
| CN | 109643776 A | 4/2019 |
| CN | 210379143 U | 4/2020 |
| CN | 111542964 A | 8/2020 |
| EP | 3347932 B1 | 11/2020 |
| JP | H8-507171 A | 7/1996 |
| JP | H09-092237 A | 4/1997 |
| JP | H9-237617 A | 9/1997 |
| JP | 2006-099997 A | 4/2006 |
| JP | 2008-251471 A | 10/2008 |
| JP | 2008-293863 A | 12/2008 |
| JP | 4606139 B2 | 1/2011 |
| JP | 5173227 B2 | 4/2013 |
| JP | 3188744 U | 2/2014 |
| JP | 2016-100304 A | 5/2016 |
| JP | 2016-207494 A | 12/2016 |
| JP | 3211262 U | 6/2017 |
| JP | 2019-008887 A | 1/2019 |
| JP | 2020-514991 A | 5/2020 |
| JP | 6695422 B2 | 5/2020 |
| KR | 10-2018-0138143 A | 12/2018 |
| KR | 10-2042577 B1 | 11/2019 |
| KR | 10-2123684 B1 | 6/2020 |
| WO | 94/19835 A1 | 9/1994 |
| WO | 2018/221004 A1 | 12/2018 |
| WO | 2019/211555 A1 | 11/2019 |

OTHER PUBLICATIONS

International Search Report (with partial translation) and Written Opinion dated Dec. 22, 2021, for corresponding International Patent Application No. PCT/KR2021/011877.

Office Action issued in corresponding Chinese Patent Application No. 202180015166.9, dated Sep. 28, 2024.

The extended European search report issued in corresponding EP Patent Application No. 21864690.9, dated Aug. 13, 2024.

Office Action issued in Japanese Patent Application No. 2022-550011 dated Oct. 2, 2023.

Office Action issued in corresponding Japanese Patent Application No. 2022-550011, dated Mar. 18, 2024. (Note: JP 2008-293863 A, Jp 2019-008887 A, Jp H09-092237 A, WO 2018/221004 A1, Jp 2006-099997 A, Jp 2016-100304 A have been previously cited).

* cited by examiner

BATTERY MODULE, BATTERY PACK, AND VEHICLE

TECHNICAL FIELD

The present disclosure relates to a battery module, a battery pack and a vehicle, and more particularly, to a battery module having improved safety against thermal runaway, fire, explosion, or the like.

The present application claims priority to Korean Patent Application No. 10-2020-0113332 filed on Sep. 4, 2020 in the Republic of Korea, the disclosures of which are incorporated herein by reference.

BACKGROUND ART

Recently, with the rapid increase in demand for portable electronic products such as laptop computers, video cameras, and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

The lithium secondary battery mainly uses lithium-based oxides and carbon materials as positive electrode active materials and negative electrode active materials, respectively. In addition, the lithium secondary battery includes an electrode assembly in which a positive electrode plate and a negative electrode plate respectively coated with the positive electrode active material and the negative electrode active material are disposed with a separator interposed therebetween, and an exterior, namely a battery case, for sealing and accommodating the electrode assembly together with an electrolyte.

In addition, according to the shape of the exterior, the lithium secondary battery may be classified into a cylindrical battery cell in which an electrode assembly is included into a metal can and a pouch-type secondary battery in which an electrode assembly is included in a pouch made of an aluminum laminate sheet.

Among them, in the case of the cylindrical battery cell, the metal can in which an electrode assembly is included may be manufactured in a cylindrical shape. The cylindrical battery cell may be used to constitute a battery module that includes a module case for accommodating a plurality of secondary batteries and a bus bar configured to electrically connect the plurality of secondary batteries.

However, the conventional battery module includes a plurality of battery cells, and if thermal runaway, ignition, or explosion occurs in some of the plurality of battery cells provided inside the battery module, the generated high-temperature gas or flame or hot internal material may be injected and transferred to adjacent battery cells, which may cause secondary thermal runaway or secondary fire or explosion. Thus, efforts are being made to prevent a plurality of battery cells from sequentially causing thermal runaway, ignition, or explosion.

DISCLOSURE

Technical Problem

The present disclosure is designed to solve the problems of the related art, and therefore the present disclosure is directed to providing a battery module having an enhanced safety against thermal runaway, fire, explosion or the like.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a plurality of battery cells respectively having electrode terminals and configured to be erected long in an upper and lower direction; an upper cover configured to extend in a horizontal direction to cover an upper portion of the plurality of battery cells and having a plurality of exposing holes formed to expose the upper portion of each of the plurality of battery cells to the outside at least partially; a lower cover configured to extend in the horizontal direction to cover a lower portion of the plurality of battery cells and having a plurality of exposing holes formed to expose the lower portion of each of the plurality of battery cells to the outside at least partially; and a filling member having electric insulation and filled in the plurality of exposing holes to seal the plurality of exposing holes formed in at least one of the upper cover and the lower cover.

The filling member may be coated to surround at least one of an upper surface of the upper portion of the plurality of battery cells a lower surface of the lower portion of the plurality of battery cells, and a part of a side surface of a side portion of the plurality of battery cells.

At least one of the upper cover and the lower cover may include a filling portion recessed inward in a region where the plurality of exposing holes are formed so as to form an accommodation space that is filled with the filling member.

A side portion and the lower portion of the plurality of battery cells, except for the upper portion thereof, may be coated with an electrically insulating coating material.

The upper cover may include a plurality of accommodation portions having a tube shape extending in the upper and lower direction so that the upper portion of each of the plurality of battery cells is inserted therein, the lower cover may include a plurality of accommodation portions having a tube shape extending in the upper and lower direction so that the lower portion of each of the plurality of battery cells is inserted therein, and at least one of the upper cover and the lower cover may include a guide portion configured to protrude from the accommodation portion toward the side portion of the battery cell inserted into the accommodation portion to partially surround the side portion of the battery cell inserted into the accommodation portion.

The accommodation portion may have an accommodation groove recessed inward so that the filling member is partially introduced therein.

At least one of the upper cover and the lower cover may have at least one input groove formed by partially perforating an outer circumference of the exposing hole so that the filling member is introduced into the accommodation portion.

The coating material may be configured to melt and flow down along the side portion of the battery cell when the battery cell is heated over a predetermined temperature and has a band portion formed to have a relatively greater thickness than the remaining portion.

In another aspect of the present disclosure, there is also provided a battery pack, comprising at least one battery module according to the former embodiments.

In still another aspect of the present disclosure, there is also provided a vehicle, comprising at least one battery module according to the former embodiments.

Advantageous Effects

According to an embodiment of the present disclosure, since the battery module of the present disclosure includes a filling member configured to seal the plurality of exposing holes in the upper cover or the lower cover, when the high-temperature gas or flame generated inside the battery can due to abnormal behavior of some of the plurality of cylindrical battery cells is ejected to the upper or lower portions of the cylindrical battery cells during use of the battery module, it is possible to the injection of the high-temperature gas or flame by means of the filling member that seals the plurality of exposing holes. Therefore, according to the present disclosure, it is possible to prevent thermal runaway or fire from propagating as the temperature of other adjacent cylindrical battery cells is increased by the ejection of high-temperature gas or flame from some cylindrical battery cells. Ultimately, the present disclosure may greatly increase the safety of the battery module in use.

Moreover, according to another embodiment of the present disclosure, the present disclosure may help the filling member to be filled in the accommodation portion since the guide portion is provided to at least one of the upper cover and the lower cover. Further, in the present disclosure, when high-temperature gas or flame is ejected through the upper or lower portion of a cylindrical battery cell, the ejected gas or flame is blocked by the filling member. Thus, when the gas or flame flows reversely to be directed inward along the inner surface of the accommodation portion, it is possible to prevent the reverse gas or flame from coming into contact with other adjacent cylindrical battery cells by means of the guide portion. Accordingly, the safety of the battery module may be improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
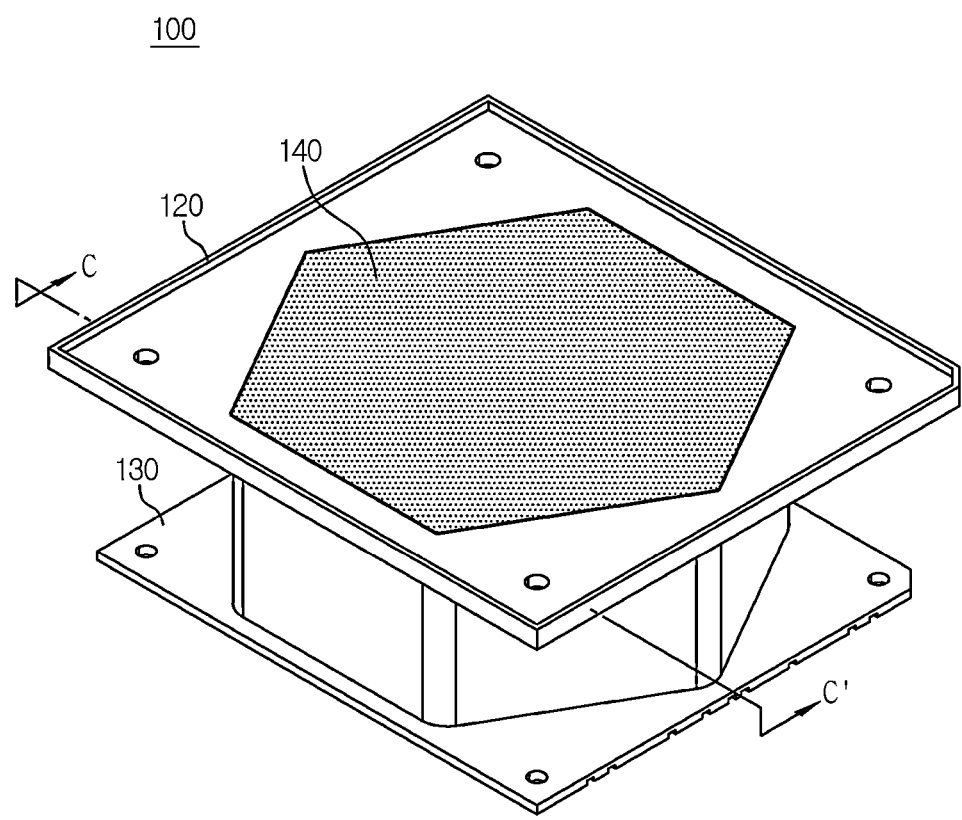
FIG. 1 is a front perspective view schematically showing a battery module according to an embodiment of the present disclosure.
Figure 2:
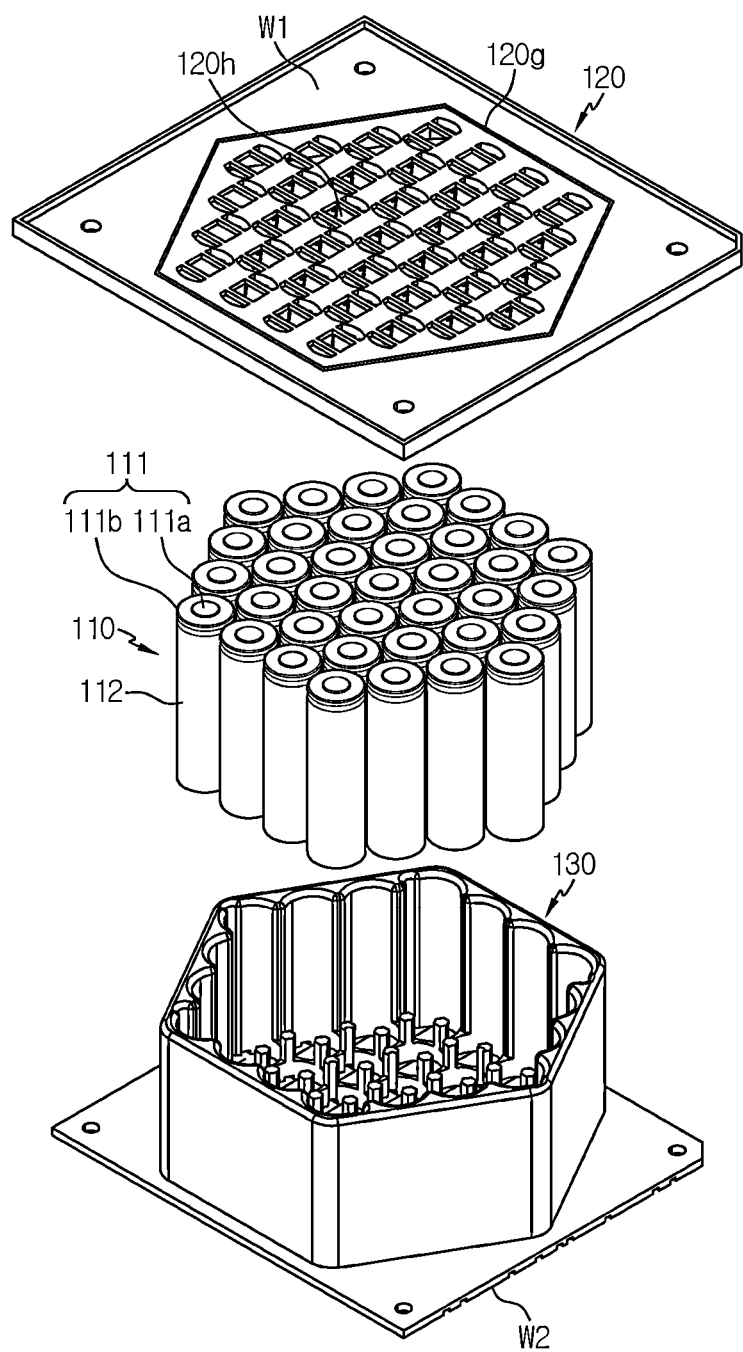
FIG. 2 is an exploded perspective view schematically showing components of the battery module according to an embodiment of the present disclosure.
Figure 3:
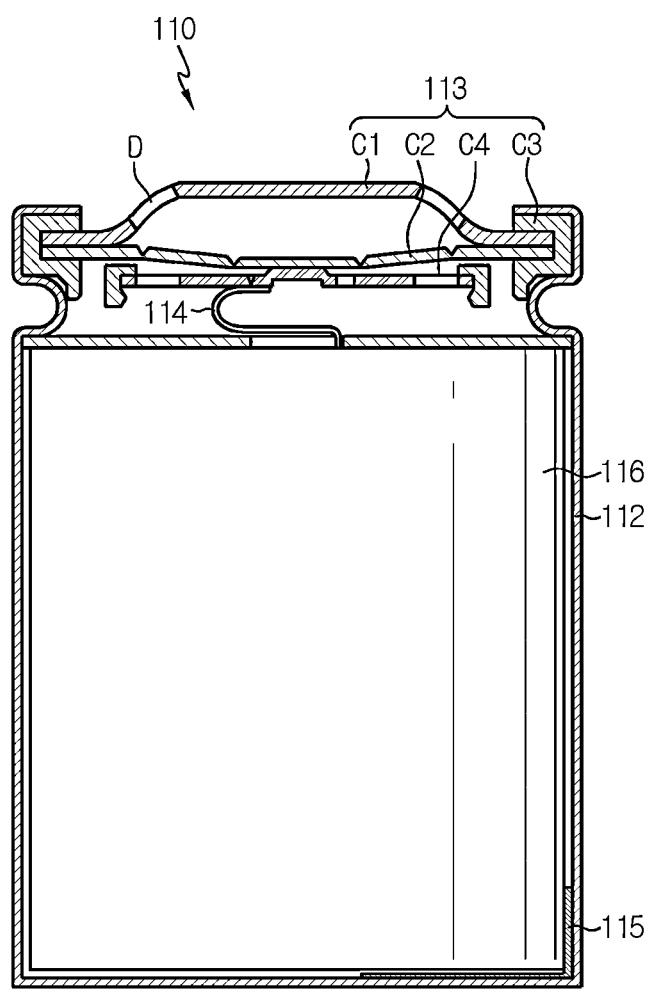
FIG. 3 is a sectional view schematically showing a cylindrical battery cell of the battery module according to an embodiment of the present disclosure.

FIG. 1 is a front perspective view schematically showing a battery module according to an embodiment of the present disclosure. FIG. 2 is an exploded perspective view schematically showing components of the battery module according to an embodiment of the present disclosure. Also, FIG. 3 is a sectional view schematically showing a cylindrical battery cell of the battery module according to an embodiment of the present disclosure. For convenience of explanation, a filling member added to an upper cover is not depicted in FIG. 2.

Referring to FIGS. 1 to 3, a battery module 100 according to an embodiment of the present disclosure includes a plurality of cylindrical battery cells 110, an upper cover 120, a lower cover 130, and a filling member 140.

Specifically, each of the plurality of cylindrical battery cells 110 may include an electrode terminal 111. The electrode terminal 111 may include a positive electrode terminal 111a and a negative electrode terminal 111b. In addition, the plurality of cylindrical battery cells 110 may be arranged to be erected long in an upper and lower direction. The plurality of cylindrical battery cells 110 may be arranged in a horizontal direction. The plurality of cylindrical battery cells 110 may be arranged to be spaced apart from each other by a predetermined interval. For example, when viewed in the F direction of FIG. 1, as shown in FIG. 2, the plurality of cylindrical battery cells 110 may be arranged in a front and rear direction (Y-axis direction) and a left and right direction (X-axis direction).

Here, the cylindrical battery cell 110 may include an electrode assembly 116, a battery can 112, and a cap assembly 113.

The electrode assembly 116 may have a structure in which a positive electrode plate and a negative electrode plate are wound with a separator interposed therebetween. Also, a positive electrode tab 114 may be attached to the positive electrode plate and connected to the cap assembly 113, and a negative electrode tab 115 may be attached to the negative electrode plate and connected to a lower end of the battery can 112.

The battery can 112 may have an empty space formed therein, so that the electrode assembly 116 may be accommodated therein. In particular, the battery can 112 may be configured in a cylindrical shape with an open top. In addition, the battery can 112 may be made of a metal material such as steel or aluminum to secure rigidity. Also, the negative electrode tab may be attached to a lower end of the battery can 112 so that not only upper and lower portions of the battery can 112 but also the battery can 112 itself may function as a negative electrode terminal 111*b*.

The cap assembly 113 may be coupled to the open top of the battery can 112 to seal the open end of the battery can 112. The cap assembly 113 may have a circular or rectangular shape depending on the shape of the battery can 112, and may include sub-components such as a top cap C1, a vent unit C2, and a gasket C3.

Here, the top cap C1 may be positioned at the top of the cap assembly 113 and configured to protrude upward. In particular, the top cap C1 may function as a positive electrode terminal 111*a* in the cylindrical battery cell 110. Accordingly, the top cap C1 may be electrically connected to another cylindrical battery cell 110 or a charging device through an external device, for example a bus bar. The top cap C1 may be made of, for example, a metal material such as stainless steel or aluminum.

In addition, if the internal pressure of the cylindrical battery cell 110, namely the internal pressure of the battery can 112, increases to a predetermined level or above, the shape of the vent unit C2 may be deformed (ruptured), so that the gas inside the battery can 112 is exhausted to the outside through an opening D of the top cap C1. Here, the predetermined level of the internal pressure may be 5 to 10 atmospheres.

Moreover, the gasket C3 may be made of a material having electric insulation so that edge portions of the top cap C1 and the vent unit C2 may be insulated from the battery can 112.

Meanwhile, the cap assembly 113 may further include a current interrupt device C4. The current interrupt device C4 is also called CID. When the internal pressure of the battery increases due to gas generation so that the shape of the vent unit C2 is reversed, the contact between the vent unit C2 and the current interrupt device C4 may be broken or the current interrupt device C4 may be damaged, thereby cutting off the electrical connection between the vent unit C2 and the electrode assembly 116.

The configuration of the cylindrical battery cell 110 is widely known to those skilled in the art at the time of filing of this application and thus will not be described in detail here. In addition, although an example of the cylindrical battery cell 110 is illustrated in FIG. 3, the battery module 100 according to the present disclosure is not limited to the configuration of the cylindrical battery cell 110 having a specific shape. That is, various types of cylindrical battery cells 110 known at the time of filing of this application may be employed in the battery module 100 according to the present disclosure.

Figure 4:
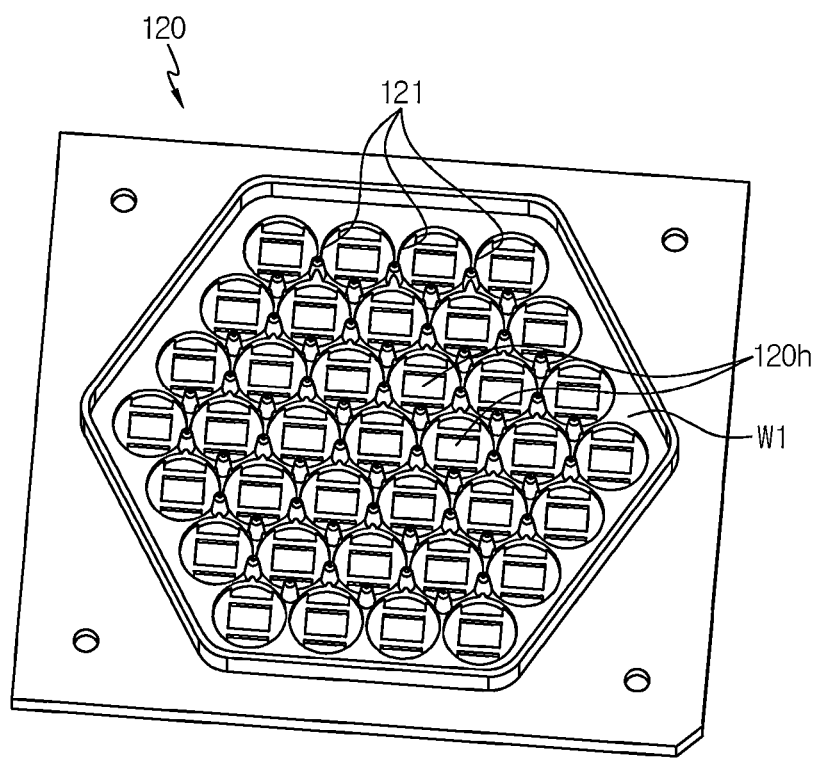
FIG. 4 is a bottom perspective view schematically showing an upper cover of the battery module according to an embodiment of the present disclosure.

FIG. 4 is a bottom perspective view schematically showing an upper cover of the battery module according to an embodiment of the present disclosure. Also, FIG. 5 is a perspective view schematically showing a lower cover of the battery module according to an embodiment of the present disclosure.

Figure 5:
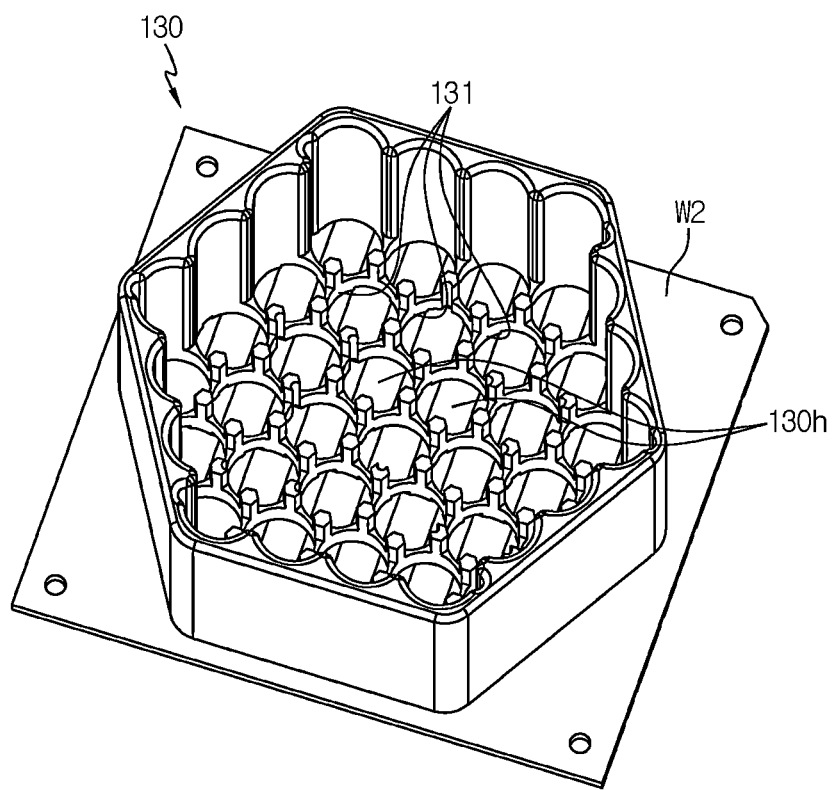
FIG. 5 is a perspective view schematically showing a lower cover of the battery module according to an embodiment of the present disclosure.

Referring to FIGS. 4 and 5 along with FIG. 2, the upper cover 120 may include a material having electric insulation. The upper cover 120 may be made of, for example, a polyvinyl chloride material or a polyethylene terephthalate material. The upper cover 120 may have an upper wall W1 extending in a horizontal direction to cover an upper portion of the plurality of cylindrical battery cells 110. A plurality of exposing holes 120*h* may be formed in the upper wall W1 so that the upper portion of each of the plurality of cylindrical battery cells 110 is at least partially exposed to the outside. The exposing hole 120*h* may have a size such that the upper surface of the cylindrical battery cell 110 may be partially or entirely exposed to the outside.

Moreover, the lower cover 130 may have a lower wall W2 extending in a horizontal direction to cover a lower portion of the plurality of cylindrical battery cells 110. A plurality of exposing holes 130*h* may be formed in the lower wall W2 so that the lower portion of each of the plurality of cylindrical battery cells 110 is at least partially exposed to the outside. The exposing hole 130*h* may have a size such that the lower surface of the cylindrical battery cell 110 may be partially or entirely exposed to the outside.

In addition, the filling member 140 may include a material having electric insulation. For example, the filling member 140 may be, for example, glue or hot-melt resin, or a silicone-based adhesive. For example, the filling member 140 may include at least one of a polysilicon resin, a polyamide-based resin, a polyimide-based resin, an epoxy-based resin, and an acrylic resin.

Further, the filling member 140 may be configured to seal the plurality of exposing holes 120*h* formed in at least one of the upper cover 120 and the lower cover 130. The filling member 140 may be configured to seal the plurality of exposing holes 120*h* by being cured after being injected into the plurality of exposing holes 120*h* in a resin form.

Accordingly, according to this configuration of the present disclosure, since the present disclosure includes the filling member 140 configured to seal the plurality of exposing holes 120*h* of the upper cover 120 or the lower cover 130, if high-temperature gas or flame generated inside the battery can 112 is ejected to the upper or lower portion of the cylindrical battery cell 110 due to abnormal behavior (operation) of some of the plurality of cylindrical battery cells 110 while the battery module 100 is in use, it is possible to block the high-temperature gas or flame by means of the filling member 140 that seals the plurality of exposing holes 120*h*. Therefore, according to the present disclosure, it is possible to prevent thermal runaway or fire from propagating as the temperature of other adjacent cylindrical battery cells 110 is increased due to high-temperature gas or flame ejected from some cylindrical battery cells 110. Ultimately, the present disclosure may significantly increase the safety of the battery module 100 in use.

Figure 6:
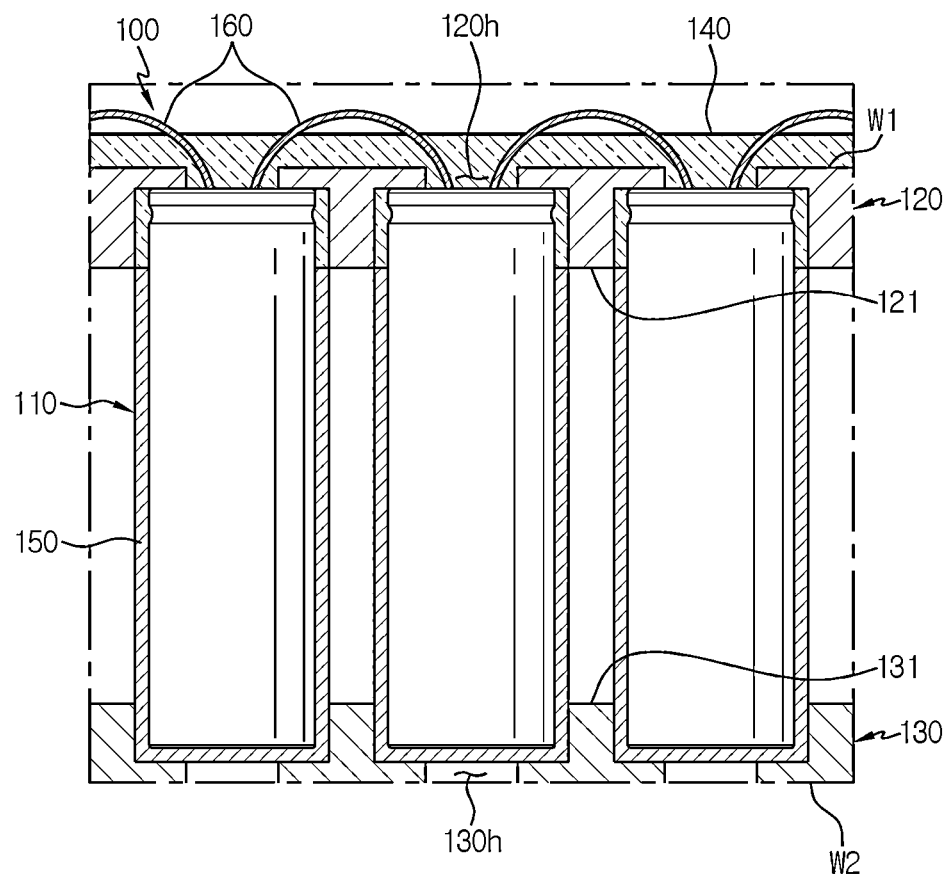
FIG. 6 is a vertical partially-sectioned view schematically showing the battery module, taken along the line C-C' of FIG. 1.

FIG. 6 is a vertical partially-sectioned view schematically showing the battery module, taken along the line C-C' of FIG. 1. For convenience of illustration, the plurality of cylindrical battery cells 110 and a coating material 150 of FIG. 6 are not shown in a cross-sectional shape but are shown in a front view, and other components such as the upper cover 120, the lower cover 130 and the filling member 140 are shown in a sectional view.

Referring to FIG. 6 along with FIG. 2, the filling member 140 of the battery module 100 according to the present disclosure may be coated on at least one of an upper surface and a lower surface of the plurality of cylindrical battery cells 110 to surround the surface. That is, the filling member 140 may be injected into the exposing hole 120h in the form of a resin and applied to at least one surface of the upper surface and the lower surface of the cylindrical battery cell 110, and then cured. For example, as shown in FIG. 6, the filling member 140 may be coated on the upper surface of the cylindrical battery cell 110. Although not shown in the drawings, the filling member 140 may be coated on the lower surface of the battery can 112 of the cylindrical battery cell 110.

In addition, the filling member 140 may be coated on a portion of the side surface of the plurality of cylindrical battery cell 110 to surround the portion of the side surface. For example, as shown in FIG. 6, the filling member 140 may be coated on the side surface to surround a side surface of the top of the side portion of the cylindrical battery cell 110. Although not shown in the drawings, the filling member 140 may be coated on the side surface to surround a side surface of the bottom of the side portion of the battery can 112 of the cylindrical battery cell 110.

Therefore, according to this configuration of the present disclosure, since the filling member 140 surrounds the outer surface of the plurality of cylindrical battery cells 110, the filling member 140 may prevent high-temperature gas or flame generated in some of the plurality of cylindrical battery cells 110 from being ejected to other adjacent cylindrical battery cells 110. Accordingly, it is possible to prevent thermal runaway or fire from propagating as the temperature of other adjacent cylindrical battery cells 110 increases due to high-temperature gas or flame ejected from some cylindrical battery cells 110.

Meanwhile, referring to FIG. 6 again along with FIG. 2, the battery module 100 may further include a plurality of bus bars 160. The bus bar 160 may be configured to form an electrical connection between the plurality of cylindrical battery cells 110. The bus bar 160 may include a conductive metal. The bus bar 160 may include, for example, at least one of copper, nickel, and aluminum. For example, the bus bar 160 may have a plate shape or a wire shape elongated in one direction.

In addition, in the battery module 100 of the present disclosure, a wire-shaped bus bar 160 may be connected to each of the positive electrode terminal 111a and the negative electrode terminal 111b of the plurality of cylindrical battery cells 110. For example, in the battery module 100 of the present disclosure, in a state where the wire-shaped bus bar 160 is connected to each of the positive electrode terminal 111a and the negative electrode terminal 111b, the filling member 140 may be coated on the surface of the plurality of cylindrical battery cells 110.

Meanwhile, referring to FIGS. 1 and 2 again, at least one of the upper cover 120 and the lower cover 130 may include a filling portion 120g. For example, as shown in FIG. 2, the upper cover 120 may include a filling portion 120g. The filling portion 120g may have a shape recessed inward to form an accommodation space in which the filling member 140 is filled. For example, the filling portion 120g may be formed to be recessed inward in a region where a plurality of exposing holes 120h of at least one of the upper cover 120 and the lower cover 130 are formed.

Here, the term 'inward' may refer to a direction toward the center of the body of the upper cover 120 or the lower cover 130. For example, as shown in FIG. 2, the upper cover 120 may include a filling portion 120g recessed downward in a region where the plurality of exposing holes 120h are formed.

In addition, the filling member 140 may be filled to fill the filling portion 120g. That is, the filling member 140 may be cured after filling the upper surface of the upper cover 120 or the lower surface of the lower cover 130 to a predetermined thickness.

Therefore, according to this configuration of the present disclosure, since at least one of the upper cover 120 and the lower cover 130 has the filling portion 120g, the filling member 140 having a predetermined thickness may be formed on an outer surface of the upper cover 120 or the lower cover 130 in which the plurality of exposing holes 120h are formed. Accordingly, even when high-temperature gas or flame generated from some of the plurality of cylindrical battery cells 110 is ejected to the outside through one exposing hole 120h, it is possible to prevent the high-temperature gas or flame from being introduced to other adjacent exposing holes 120h by means of the filling member 140 filled in the filling portion 120g. Accordingly, in the present disclosure, it is possible to prevent thermal runaway or fire from propagating to adjacent cylindrical battery cells 110.

Meanwhile, referring to FIG. 6 again along with FIG. 2, each of the plurality of cylindrical battery cells 110 of the present disclosure may be coated with an electrically insulating coating material 150. For example, the electrically insulating coating material 150 may include a material having a heat-shrinkable property in which the volume is reduced above a predetermined temperature. For example, the material having a heat-shrinkable property may be manufactured using a polyester-based resin, a polyolefin-based resin, or a polyphenylene sulfide-based resin. More specifically, the material having a heat-shrinkable property may include at least one of polyvinyl chloride, polystyrene, polyethylene terephthalate (PET), polyolefin, nylon, polyvinyl chloride (PVC) and polybutylene terephthalate (PBT).

In addition, the electrically insulating coating material 150 may be configured to surround the side portion and the lower portion of the plurality of cylindrical battery cells 110, except for the upper portion. That is, the coating material 150 may be coated to surround the horizontal side surface and the lower surface of the battery can 112 of the cylindrical battery cell 110.

Therefore, according to this configuration of the present disclosure, since the coating material 150 is coated on the side portion and the lower portion of each of the plurality of cylindrical battery cells 110, when the side portion of the cylindrical battery cell 110 is ruptured due to the gas generated by abnormal behavior of some cylindrical battery cells 110 while the battery module 100 is being charged and discharged, the coating material 150 may prevent the high-temperature gas or flame from being directly ejected to other adjacent cylindrical battery cells 110. Therefore, according to the present disclosure, as the coating material 150 is applied to the remaining portion of the cylindrical battery cell 110 on which the filling member 140 is not coated, it is possible to greatly improve the safety of the battery module 100 in use.

Meanwhile, referring to FIG. 6 along with FIG. 2, the upper cover 120 of the battery module 100 according to an embodiment of the present disclosure has a plurality of accommodation portions 121 having a tube shape such that the upper portion of each of the plurality of cylindrical battery cells 110 is inserted. The accommodation portion 121 may have a tube shape extending downward from the lower surface of the upper wall W1 of the upper cover 120.

In addition, the lower cover 130 may include a plurality of accommodation portions 131 having a tube shape configured such that the lower portion of each of the plurality of cylindrical battery cells 110 is inserted. The accommodation portion 131 may have a tube shape extending upward from the upper surface of the lower wall W2 of the lower cover 130.

Figure 7:
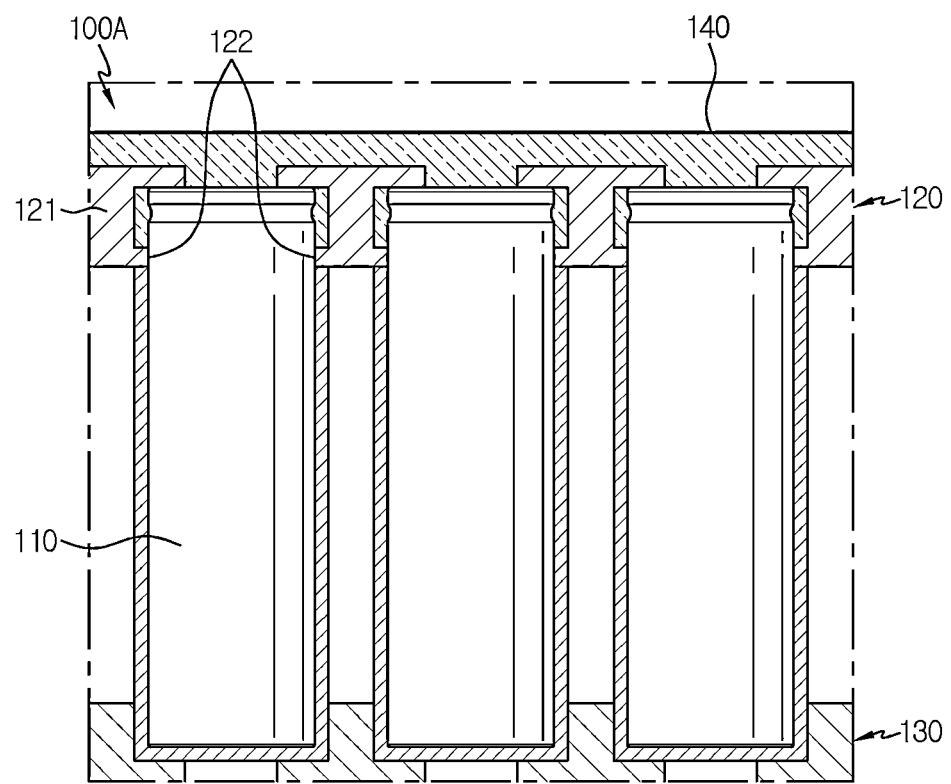
FIG. 7 is a vertical partially-sectioned view schematically showing a battery module according to another embodiment of the present disclosure.

FIG. 7 is a vertical partially-sectioned view schematically showing a battery module according to another embodiment of the present disclosure.

Referring to FIG. 7, the battery module 100A of FIG. 7 may further include a guide portion 122 in the accommodation portion 121 of at least one of the upper cover 120 and the lower cover 130, when compared with the upper cover 120 of the battery module 100 of FIG. 6. The other components of the battery module 100A of FIG. 7 are the same as those of the battery module 100 of FIG. 6 and thus will not be described in detail.

Also, the guide portion 122 may have a protruding shape to partially surround the side portion of the cylindrical battery cell 110 inserted into the accommodation portion 121. For example, referring to FIG. 7, the upper cover 120 may include a guide portion 122 formed at a lower end of the accommodation portion 121 to protrude toward the side portion of the cylindrical battery cell 110. That is, as the guide portion 122, the accommodation portion 121 of any one of the upper cover 120 and the lower cover 130 may have a shape in which an end of the tube shape is bent toward the center. Although not shown, when the filling member 140 is filled in each of the plurality of exposing holes 120h of the lower cover 130, the lower cover 130 may include the guide portion 122 configured to protrude from the accommodation portion 121 of the accommodation portion 121 toward the side portion of the cylindrical battery cell 110.

Moreover, the guide portion 122 may be configured such that the filling member 140 does not escape out of the accommodation portion 121 when the filling member 140 is filled between the accommodation portion 121 and the cylindrical battery cell 110. That is, the filling member 140 may be introduced through the exposing hole 120h in a resin form and be filled up to the end of the accommodation portion 121 where the guide portion 122 is formed.

Therefore, according to this configuration of the present disclosure, the present disclosure may help the filling member 140 to be filled in the accommodation portion 121 since the guide portion 122 is provided to at least one of the upper cover 120 and the lower cover 130. Further, in the present disclosure, when high-temperature gas or flame is ejected through the upper or lower portion of the cylindrical battery cell 110, the ejected gas or flame is blocked by the filling member 140. Thus, when the gas or flame flows reversely to be directed inward along the inner surface of the accommodation portion 121, it is possible to prevent the reverse gas or flame from coming into contact with other adjacent cylindrical battery cells 110 by means of the guide portion 122. Accordingly, the safety of the battery module 100A may be improved.

Figure 8:
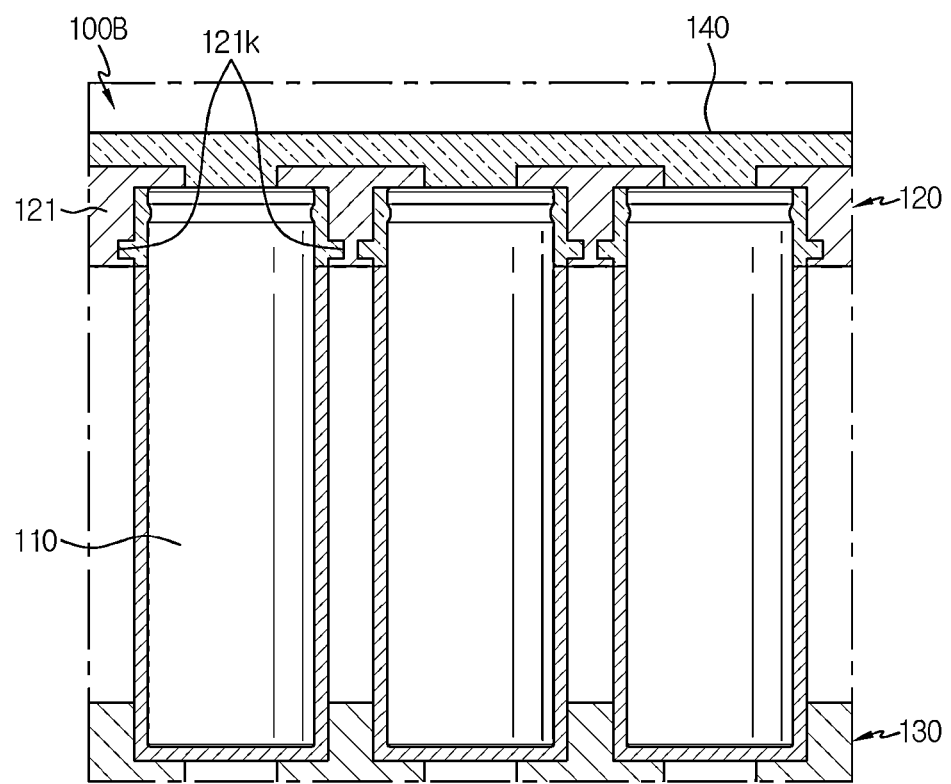
FIG. 8 is a vertical partially-sectioned view schematically showing a battery module still according to another embodiment of the present disclosure.

FIG. 8 is a vertical partially-sectioned view schematically showing a battery module still according to another embodiment of the present disclosure.

Referring to FIG. 8, in the battery module 100B according to another embodiment of the present disclosure, an accommodation groove 121k recessed inward so that the filling member 140 is partially introduced therein may be formed in the accommodation portion 121 of any one of the upper cover 120 and the lower cover 130. For example, the accommodation groove 121k may have an elongated shape along the inner surface of the tube shape of the accommodation portion 121. That is, the accommodation groove 121k may be configured such that the filling member 140 may be formed to a predetermined thickness along an outer surface of the side portion of the cylindrical battery cell 110. For example, as shown in FIG. 8, the accommodation portion 121 of the upper cover 120 may include an accommodation groove 121k. A portion of the filling member 140 may be filled in the accommodation groove 121k.

Therefore, according to this configuration of the present disclosure, since the accommodation groove 121k is formed in the accommodation portion 121 of any one of the upper cover 120 and the lower cover 130, the filling member 140 of a predetermined thickness may be formed at an end of the accommodation portion 121. Thus, it is possible to effectively prevent gas or flame discharged from the cylindrical battery cell 110 from flowing inward reversely through the accommodation portion 121 by means of the filling member 140.

Figure 9:
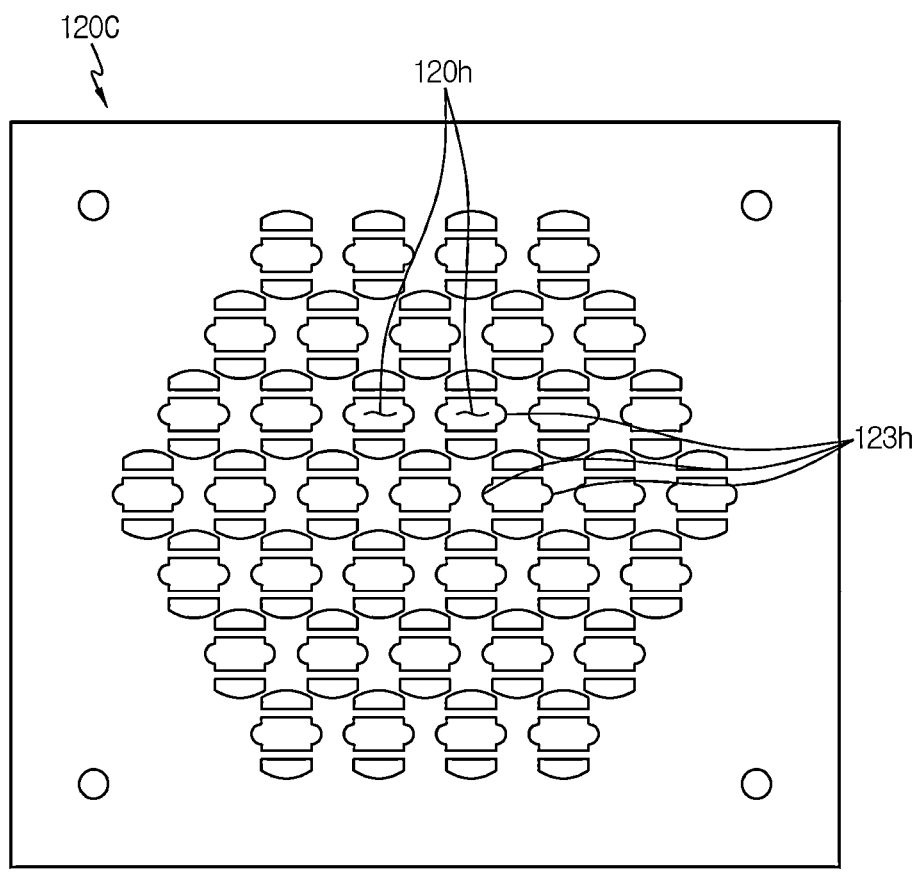
FIG. 9 is a plan view schematically showing a battery module still according to another embodiment of the present disclosure.

FIG. 9 is a plan view schematically showing a battery module still according to another embodiment of the present disclosure.

Referring to FIG. 9 along with FIG. 2, the upper cover 120C of the battery module according to still another embodiment of the present disclosure of FIG. 9 may further have at least one input groove 123h, when compared to the battery module 100 of FIG. 2.

Specifically, the input groove 123h may be formed in at least one of the upper cover 120 and the lower cover 130. The input groove 123h may be perforated so that the filling member 140 is inserted into the accommodation portion 121 in which the cylindrical battery cell 110 is accommodated. The input groove 123h may be formed by perforating a part of the outer circumference of the exposing hole 120h. For example, as shown in FIG. 9, in the upper cover 120, four input grooves 123h may be formed at the outer circumference of the exposing hole 120h.

Therefore, according to this configuration of the present disclosure, the filling member 140 may be smoothly introduced into the accommodation portion 121 by the input groove 123h formed at the outer circumference of the exposing hole 120h. Accordingly, in the present disclosure, the filling member 140 may be appropriately applied to the cylindrical battery cell 110 accommodated in the accommodation portion 121, and thus it is possible to effectively prevent that a high-temperature gas or flame emitted from the cylindrical battery cell 110 is transferred to other adjacent cylindrical battery cells 110.

Figure 10:
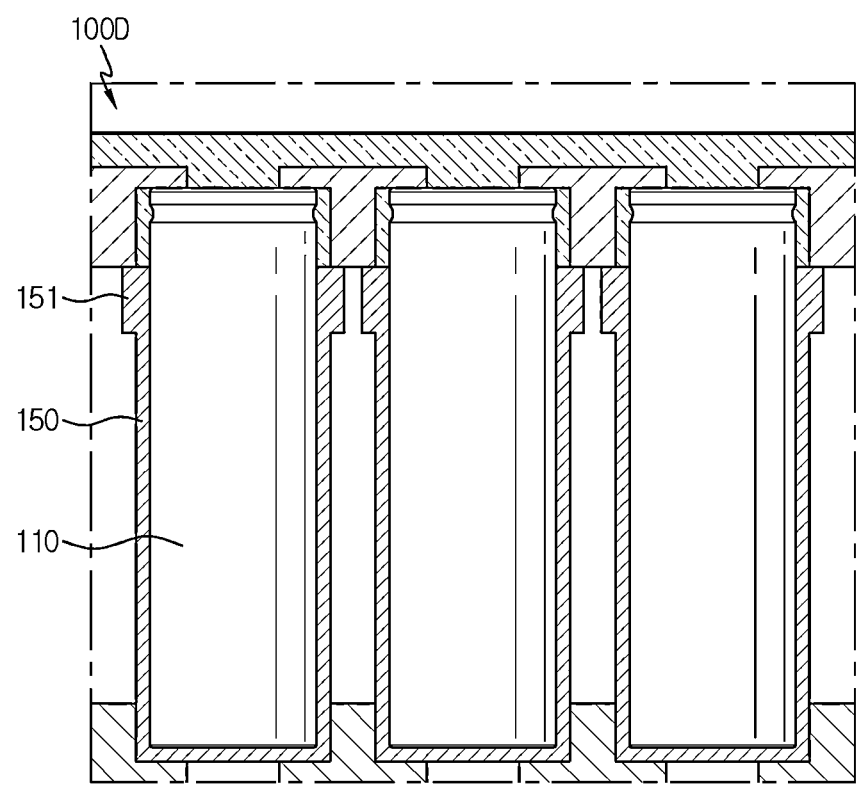
FIG. 10 is a vertical partially-sectioned view schematically showing a battery module still according to another embodiment of the present disclosure.

FIG. 10 is a vertical partially-sectioned view schematically showing a battery module still according to another embodiment of the present disclosure. For convenience of illustration, the plurality of cylindrical battery cells 110 and the coating material 150 of FIG. 10 are not shown in a sectional view but shown in a front view, and other components such as the upper cover 120, the lower cover 130 and the filling member 140 are shown in a sectional view.

Referring to FIG. 10, the battery module 100D according to still another embodiment of the present disclosure may further include a band portion 151 in the coating material 150, when compared to the battery module 100D illustrated in FIG. 6.

Specifically, the band portion 151 may be configured to melt and flow down along the side portion of the cylindrical battery cell 110 when the cylindrical battery cell 110 is heated over a predetermined temperature. For example, the band portion 151 may include a material that melts at about 200 to 300° C. The band portion 151 may be a portion formed to have a relatively greater thickness than the remaining portion of the coating material 150. For example, the band portion 151 may be formed to surround the horizontal side portion of the cylindrical battery cell 110.

Therefore, according to this configuration of the present disclosure, since the band portion 151 is further provided to the coating material 150 separately, when thermal runaway or fire is generated in some of the plurality of cylindrical battery cells 110 so that the side portion of the cylindrical battery cell is ruptured, the band portion 151 may melt and flow down along the side portion of the cylindrical battery cell 110 to cover the ruptured portion. Accordingly, it is possible to minimize that a high-temperature gas or flame is directly ejected to other cylindrical battery cell 110 adjacent to the cylindrical battery cell 110 where a thermal runaway or fire is generated. Ultimately, in the present disclosure, it is possible to effectively increase the safety of the battery module 100.

Meanwhile, a battery pack (not shown) according to an embodiment of the present disclosure may include at least two battery module 100 as above. In addition, the battery pack may include a pack housing (not shown) having an accommodation space for accommodating the at least two battery modules 100. In addition, the battery pack may further include various devices (not shown) for controlling charging and discharging of the battery module 100, for example a battery management system (BMS), a current sensor, a fuse, and the like.

In addition, the battery pack according to an embodiment of the present disclosure may be included in a vehicle such as an electric vehicle or a hybrid electric vehicle. That is, the vehicle according to an embodiment of the present disclosure may include at least battery pack according to an embodiment of the present disclosure described above to be mounted in a vehicle body.

Meanwhile, a vehicle (not shown) according to an embodiment of the present disclosure may include at least one battery module 100 as described above and an accommodation space for accommodating the battery module 100. For example, the vehicle may be an electric vehicle, an electric scooter, an electric wheelchair, or an electric bike.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
    a plurality of battery cells respectively having electrode terminals and configured to be erected long in a vertical direction;
    an upper cover configured to extend in a horizontal direction to cover an upper portion of the plurality of battery cells and having a plurality of exposing holes to expose the upper portion of the plurality of battery cells to outside at least partially;
    a lower cover configured to extend in the horizontal direction to cover a lower portion of the plurality of battery cells and having a plurality of exposing holes to expose the lower portion of the plurality of battery cells to the outside at least partially; and
    a filling member, of an electrically insulating material, filled in the plurality of exposing holes of at least one of the upper cover and the lower cover to seal the plurality of exposing holes formed in at least one of the upper cover and the lower cover,
    wherein the filling member is coated on at least one of an upper surface of the upper portion of the plurality of battery cells and a lower surface of the lower portion of the plurality of battery cells.

2. The battery module according to claim 1, wherein the filling member is coated to surround a part of a side surface of a side portion of the plurality of battery cells.

3. The battery module according to claim 1, wherein at least one of the upper cover and the lower cover includes a filling portion recessed inward in a region where the plurality of exposing holes of the at least one of the upper cover and the lower cover are formed to form an accommodation space filled with the filling member.

4. The battery module according to claim 1, wherein a side portion and the lower portion of the plurality of battery cells are coated with an electrically insulating coating material, and the electrically insulating coating material is absent on the upper portion of the plurality of battery cells.

5. The battery module according to claim 4, wherein the upper cover includes a plurality of accommodation portions each having a tube shape extending in the vertical direction so that a respective upper portion of each of the plurality of battery cells is inserted into a corresponding one of the plurality of accommodation portions,
    wherein the lower cover includes a plurality of accommodation portions each having a tube shape extending in the vertical direction so that a respective lower portion of each of the plurality of battery cells is inserted into a corresponding one of the plurality of accommodation portions of the lower cover,
    wherein at least one of the upper cover and the lower cover includes a guide portion configured to protrude from a corresponding accommodation portion toward a side portion of a battery cell inserted into the corresponding accommodation portion to partially surround the side portion of the battery cell inserted into the corresponding accommodation portion, and
    wherein the battery cell is one of the plurality of battery cells.

6. The battery module according to claim 5, wherein the corresponding accommodation portion has an accommodation groove recessed inward so that the filling member is partially introduced therein.

7. The battery module according to claim 5, wherein at least one of the upper cover and the lower cover has at least one input groove formed by partially perforating an outer circumference of an exposing hole so that the filling member is introduced into the corresponding accommodation portion.

8. The battery module according to claim 1, wherein a side portion of a battery cell is coated with an electrically insulating coating material, wherein the electrically insulating coating material comprises a band portion and a remaining portion, wherein the band portion has a greater thickness than the remaining portion, wherein the band portion is configured to melt and flow down along the side portion of the battery cell when the battery cell is heated to a temperature over a predetermined temperature, and wherein the battery cell is one of the plurality of battery cells.

9. The battery module according to claim 1, wherein the upper portion of the plurality of battery cells comprises upper portions of the plurality of battery cells, the lower portion of the plurality of battery cells comprises lower portions of the plurality of battery cells, the upper surface comprises upper surfaces, and the lower surface comprises lower surfaces.

10. The battery module according to claim 1, wherein the filling member is injected into the plurality of exposing holes of at least one of the upper cover and the lower cover.

11. The battery module according to claim 10, wherein after the filling member is injected, the filling member is cured.

12. The battery module according to claim 10, wherein each of the plurality of exposing holes of the upper cover exposes a respective upper portion of the plurality of battery cells, and wherein each of the plurality of exposing holes of the lower cover exposes a respective lower portion of the plurality of battery cells.

13. A battery pack, comprising the battery module according to claim 1.

14. A vehicle, comprising the battery module according to claim 1.

* * * * *